United States Patent [19]

Nakamura et al.

[11] Patent Number: 5,410,365
[45] Date of Patent: Apr. 25, 1995

[54] VIDEO CAMERA WITH COARSE ANALOG AND FINE DIGITAL BLACK LEVEL ADJUSTMENT

[75] Inventors: Koichi Nakamura; Takashi Asaida, both of Kanagawa, Japan

[73] Assignee: Sony Corporation, Tokyo, Japan

[21] Appl. No.: 40,286

[22] Filed: Mar. 30, 1993

[30] Foreign Application Priority Data

Apr. 2, 1992 [JP] Japan .................. 4-110696
Apr. 8, 1992 [JP] Japan .................. 4-116864

[51] Int. Cl.$^6$ .................. H04N 9/72; H04N 5/16; H04N 5/235
[52] U.S. Cl. .................. 348/692; 348/693; 348/697; 348/615; 348/257; 348/687; 348/688
[58] Field of Search ............ 358/171, 172, 173, 34, 358/168, 163, 461, 213.15, 213.16, 213.17; 348/615, 673, 691-698, 687, 688, 689, 257-261, 241-251

[56] References Cited

U.S. PATENT DOCUMENTS

| | | | |
|---|---|---|---|
| 4,481,535 | 11/1984 | Hodd et al. | 348/615 |
| 4,489,344 | 12/1984 | Ikeda et al. | 348/673 |
| 4,694,334 | 9/1987 | Bucher et al. | 348/615 |
| 4,701,786 | 10/1987 | Yamanaka | 358/34 X |
| 4,786,969 | 11/1988 | Shouji et al. | 348/693 |
| 4,823,188 | 4/1989 | Fauquet et al. | 358/163 X |
| 4,907,084 | 3/1990 | Nagafusa | 358/213.16 X |
| 5,008,753 | 4/1991 | Kitaura et al. | 348/695 |
| 5,057,920 | 10/1991 | Wilkinson | 358/171 |
| 5,087,973 | 2/1992 | Kawahara | 348/691 |
| 5,087,976 | 2/1992 | Oda et al. | 358/168 X |
| 5,105,276 | 4/1992 | Schrock | 358/213.15 X |
| 5,111,311 | 5/1992 | Yamamoto | 358/163 X |
| 5,142,354 | 8/1992 | Suzuki et al. | 358/34 |
| 5,146,332 | 9/1992 | Hara et al. | 358/171 X |

FOREIGN PATENT DOCUMENTS

| | | | |
|---|---|---|---|
| 0207543 | 1/1987 | European Pat. Off. | H04N 5/335 |
| 0240937 | 10/1987 | European Pat. Off. | H04N 5/217 |
| 0357054 | 3/1990 | European Pat. Off. | H04N 9/04 |
| 0393811 | 10/1990 | European Pat. Off. | H04N 9/64 |
| 0436442 | 7/1991 | European Pat. Off. | H04N 5/217 |
| 2159473 | 6/1973 | Germany | H04N 5/16 |
| 2155273 | 9/1985 | United Kingdom | H04N 9/09 |

OTHER PUBLICATIONS

SMPTE Journal vol. 99, No. 9, 30 Sep. 1990, Scarsdale, NY US pp. 727–733, XP000108997 S. Nishikawa et al. 'Broadcast-Quality TV Camera with Digital Signal Processor'.

IEEE Transactions on Consumer Electronics vol. 35, No. 3, 30 Aug. 1989, New York, US pp. 382–388 XP000065834 K. Parulski et al. 'A digital color CCD Imaging System using custom VLSI circuits'.

Patent Abstracts of Japan vol. 14, No. 346 (E-956) 26 Jul. 1990 & JP-A-21 19 381 (Toshiba Corp) 7 May 1990.

Benson, K. Blair, "Television Engineering Handbook", McGraw Hill Book Company, 1986, pp. 17.9–17.13.

*Primary Examiner*—Victor R. Kostak
*Assistant Examiner*—John Miller
*Attorney, Agent, or Firm*—William S. Frommer; Alvin Sinderbrand

[57] ABSTRACT

In an image pick up device, signal level of red, green and blue color signals is coarsely adjusted in a signal processing circuit, and then a black level of video signal is finely adjusted in a digital signal processing circuit, thereby being capable of easily adjusting the black level and improving the accuracy of black level adjustment.

8 Claims, 13 Drawing Sheets

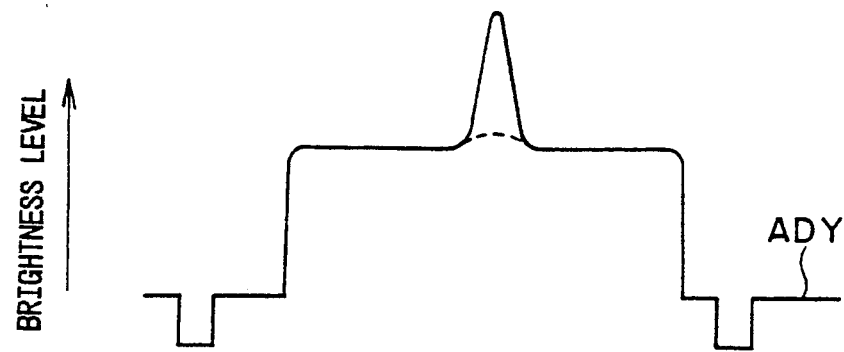
FIG. 8
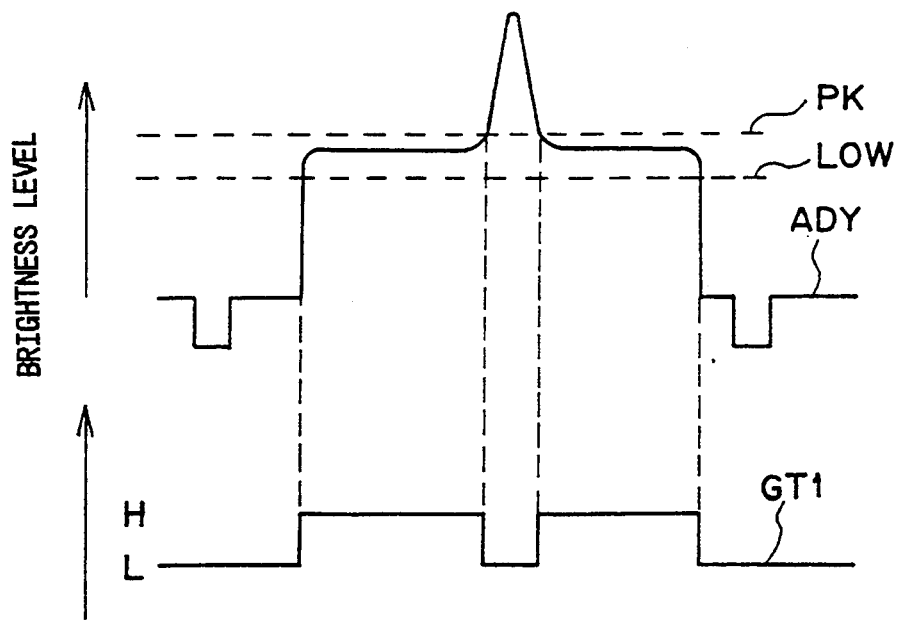
FIG. 9A
FIG. 9B

VIDEO CAMERA WITH COARSE ANALOG AND FINE DIGITAL BLACK LEVEL ADJUSTMENT

FIELD OF THE INVENTION

The present invention relates to an image pick-up device which, for example, can be used for a television camera.

BACKGROUND OF THE INVENTION

Hitherto, image pick-up devices of the above type have been so designed that even when the amplification factor of a produced image signal is switched, the black level does not vary since the black level is adjusted. More specifically, in this type of image pick-up device, image signals output from a solid-state image element are converted into color signals and amplified to a predetermined level so that the amplification factor can be switched in response to the operation of a gain switching operation element when a produced image is dark.

The image pick-up device corrects a signal level so as to make black levels among the color signals equal to each other by converting correction data which has been previously stored in a memory circuit into analog signals and performing addition or subtraction operations on the color signals and by switching the correction data in response to the operation of the gain switching operation element. As a result, the black level does not vary.

The image pick-up device detects the black level of each color signal and sets correction data on the basis of the result of the detection. Simplification of the adjustment operation and an increase in adjustment accuracy contribute to making the image pick-up device of the present invention convenient to use and make it possible to improve the quality of the image.

SUMMARY OF THE INVENTION

The present invention has been achieved in view of the above-described circumstances. An object of the present invention is to provide an image pick-up device capable of easily adjusting the black level and improving the accuracy of black level adjustment.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 8 is a signal waveform chart illustrating the suppression of a portion where a brightness level rises sharply;

FIGS. 9A and 9B are signal waveform charts illustrating the generation of a gate signal;

DETAILED DESCRIPTION OF THE INVENTION

A preferred embodiment of the present invention will be explained below in detail with reference to the accompanying drawings:

(1) Overall Construction

Figure 1:
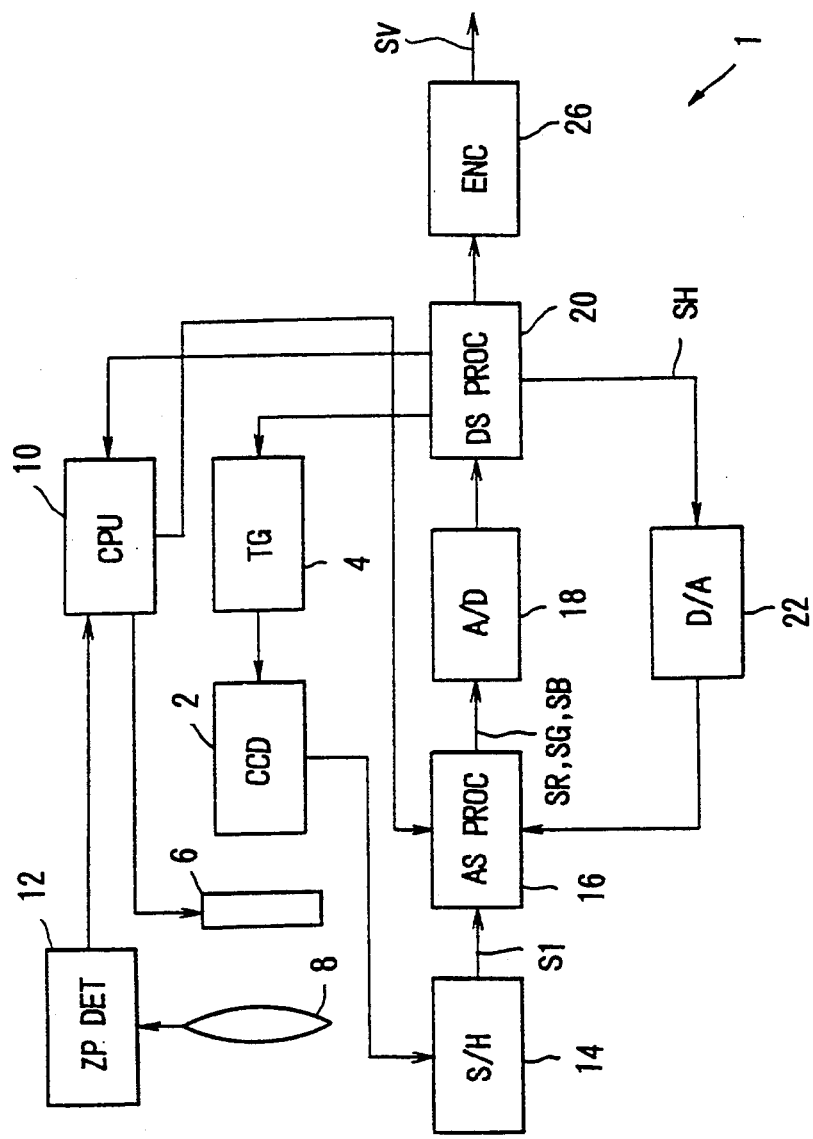
FIG. 1 is a block diagram illustrating an image pick-up device in accordance with the present invention.

Reference to FIG. 1, reference numeral 1 denotes an image pick-up device as a whole which drives a solid-state image pick-up device (CCD) 2 to produce an image of a desired object. The image pick-up device 1 generates a reference signal by a timing generator (TG) 4 and drives the solid-state image pick-up device 2 in accordance with this reference signal.

In the image pick-up device 1, an iris 6 and a zoom lens 8 are arranged in front of the solid-state image pick-up device 2. As a result, the image of the object is produced on the image plane of the solid-state image pick-up device 2 at a desired magnification factor and brightness.

At this time, a central processing unit (CPU) 10 detects the magnification factor of the produced image by a zoom position detecting circuit 12, and switches the control of the iris 6 on the basis of the result of this detection. As a result, even when the magnification factor is varied, an image of an object having a brightness level desired by a user can be produced.

Further, the image pick-up device 1 sample-holds output signals from the solid-state image pick-up device 2 by means of a sample hold circuit (S/H) 14 which uses a correlation double sampling technique and outputs an image signal S1 obtained as a result of using this technique to an analog signal processing circuit 16.

The analog signal processing circuit 16 is designated to amplify each color signal at a predetermined amplification factor after each color signal is generated on the basis of the image signal S1, perform shading correction or the like by correcting the level of each color signal, and perform white balance adjustment and gain increase adjustment after the amplification factor is changed.

An analog/digital conversion circuit (A/D) 18 converts color signals SR to SB output from the analog signal processing circuit 16 into digital signals and outputs these signals.

A digital signal processing circuit 20 performs an operation for detecting data used for black level adjustment, black balance adjustment, white balance adjustment, iris adjustment, and flare adjustment, and outputs the results of this detection to the central processing unit 10 as required.

As a result, white balance adjustment or the like can be performed by the image pick-up device 1 since each signal processing circuit is controlled by the central processing unit 10 on the basis of the results of the above data detection.

The digital signal processing circuit 20 corrects the level of each color signal on the basis of the result of the data detection so as to perform flare adjustment and generate a correction signal SH of shading correction, and outputs the correction signal SH to the analog signal processing circuit 16 through a digital/analog conversion circuit (D/A) 22. As a result, the image pick-up device 1 performs shading correction by using the correction signal SH generated by the digital signal processing circuit 20.

Figure 2:
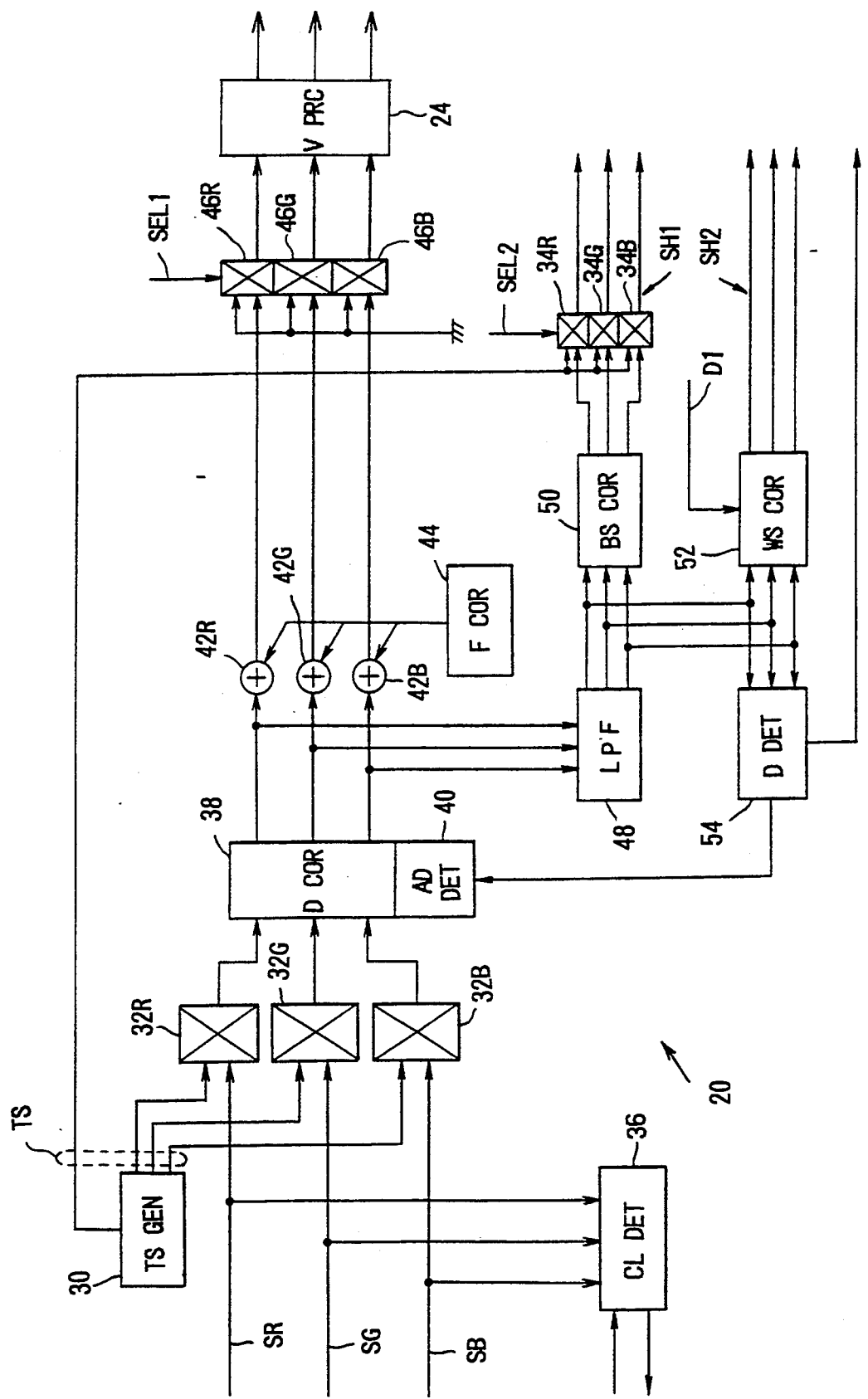
FIG. 2 is a block diagram illustrating a digital signal processing circuit in accordance with the present invention.

A video processing circuit 24 receives a flare-corrected color signal and sets a pedestal level, as shown in FIG. 2. Gamma processing is performed on the color signal having a pedestal level set thereto. An encoder circuit 26 which is positioned next to the video processing circuit 24 converts each color signal into a brightness signal and a color difference signal, and then converts these signals into video signals and outputs them.

As a result, the image pick-up device 1 produces an image of a desired object and outputs a video signal SV thereof.

(2) Digital Signal Processing Circuit

As shown in FIG. 2, the digital signal processing circuit 20 generates various test signals TS by a test signal generating circuit 30 and outputs the signals to selectors 32R, 32G and 32B, and 34R, 34G and 34B, and switches these test signals on the basis of an output signal from the central processing unit 10.

As a result, in the adjustment mode, the digital signal processing circuit 20 uses various test signals TS as required so as to adjust the analog signal processing circuit 16 or the like. Thus, in the self-diagnostic mode, the entire operation can be confirmed.

Furthermore, the digital signal processing circuit 20 supplies the color signals SR to SB formed of digital signals to a clamp level detecting circuit 36 whereby the signal level of each of the color signals SR to SB is detected at predetermined timings. The digital signal processing circuit 20 further outputs the results of the signal level detection to a clamp circuit (not shown), thereby setting the clamp levels of the various color signals SR to SB. The selectors 32R to 32B selects the color signals SR to SB and outputs them to a defect correcting circuit 38 in the normal operating mode, whereas in the self-diagnostic mode a contact point is switched at a predetermined timing so that a test signal is selected and output in place of the color signals SR to SB during one horizontal scanning period in a vertical blanking period.

In the adjustment mode, in contrast, the selectors 32R to 32B switch contact points at predetermined timings in accordance with each adjustment item under the control of the central processing unit 10, so that various test signals are output in place of the color signals SR to SB from the image pick-up device 1 to easily adjust various items.

An automatic defect detecting circuit 40 detects defective pixels of the solid-state image pick-up device 2 by continuously monitoring the level of each color signal and stores the positions of these defective pixels in a predetermined memory circuit (not shown).

The defect correcting circuit 38 performs an interpolation computing operation at the position of a defect pixel in accordance with the contents of the memory circuit. Then, the defect correcting circuit 38 generates color signals for correction on the basis of pixels adjacent to the defect pixel and replaces the color signal of the defect pixel with the generated color signal. As a result, the defect correcting circuit 38 is designed not to deteriorate the quality of the image even when a defect occurs in the solid-state image pick-up device 2.

Addition circuits 42R to 42B add a flare correction signal output from a flare correcting circuit 44 to each color signal in order to correct the flare of the image formed. The flare correcting circuit 44 generates a flare correction signal on the basis of the result of the computation by the central processing unit 10. As a result, flare correction can be performed by the image pick-up device 1 which requires an easy adjustment operation.

Selectors 46R to 46B output signals from the addition circuits 42R to 42B to a video processing circuit 24 which is positioned next thereto and makes the output signal level fall to a "0" level by switching the contact point when the level of the selection signal SEL1 is switched.

The image pick-up device 1 makes the input level of the video processing circuit 24 fall to a "0" level as required in the adjustment mode or the like and saves the power of circuit blocks which are positioned after the video processing circuit 24.

A low-pass filter (LPF) circuit 48 removes noise components from color signals output from the defect correcting circuit 38 by suppressing the high-pass components and outputs them. A black shading correcting circuit 50 and a white shading correcting circuit 52 generate shading correction signals SH1 and SH2, on the basis of an output signal from the low-pass filter (LPF) circuit 48. In this embodiment, black level shading and white level shading are corrected by shading correction signals SH1 and SH2, respectively.

The white shading correcting circuit 52 generates a shading correction signal SH2 for shading correction from each color signal on the basis of the result D1 of the computation by the central processing unit 10. As a result, the digital signal processing circuit 20 feeds back the shading correction signals SH1 and SH2 to the analog signal processing circuit 16 so that white shading correction is performed.

The black shading correcting circuit 50 outputs the shading correction signal SH1 via the selectors 34R to 34B which select and output a test signal in place of the correction signal SH1 when a selection signal SEL2 rises.

Thus, the image pick-up device 1 can select and output the shading correction signal SH1 and the test signal as required so that an operation for adjusting the analog signal processing circuit can be simplified.

A data detecting circuit 54 detects the level of an output signal from the low-pass filter circuit 48 in order to detect data or the like for flare correction and white balance adjustment.

The data detecting circuit 54 stores data on iris adjustment as obtained as a result of the detection in a memory circuit of the defect correcting circuit 38 so that the contents of the memory circuit can be accessed from the central processing unit 10 and the iris can be easily adjusted.

Figure 3:
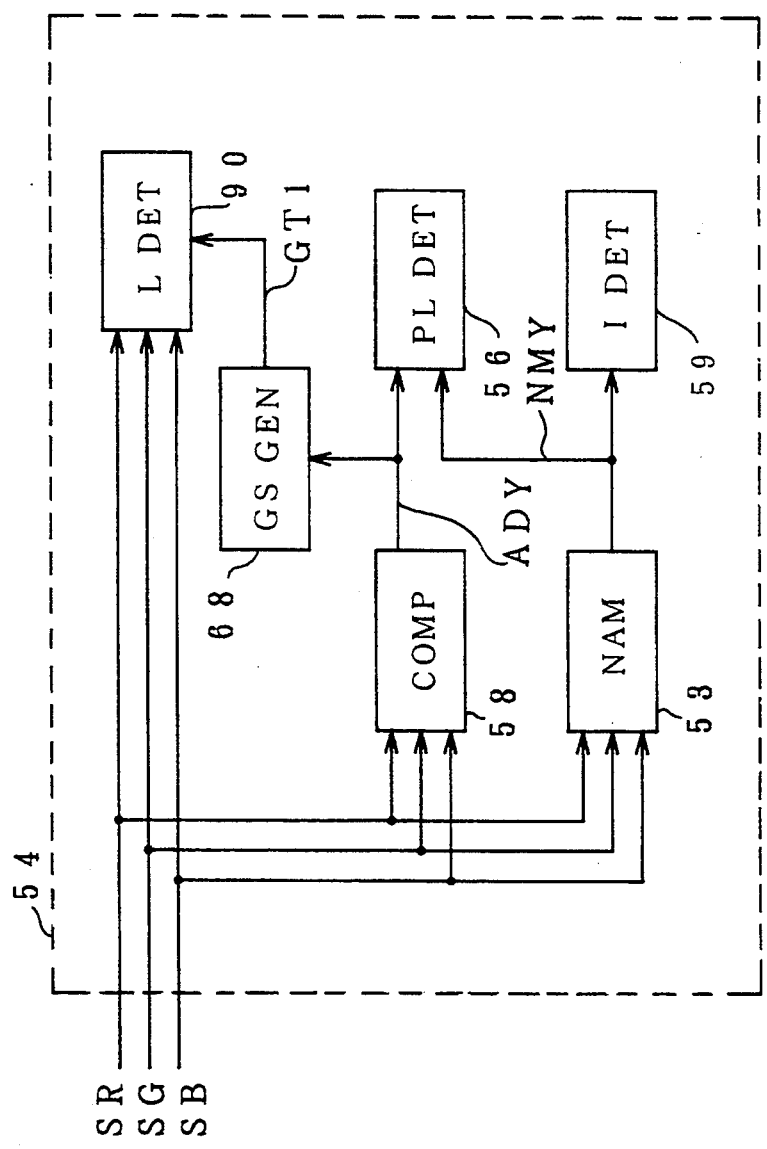
FIG. 3 is a block diagram illustrating a data detecting circuit in accordance with the present invention.

The data detecting circuit 54 as shown in FIG. 3 is formed of a level detecting circuit 90, a gate signal generating circuit 68, a computing circuit 58, a peak level detecting circuit 56, a non-additive mixing circuit (NAM) circuit 53 an iris detecting circuit 59 and the like.

Color signals SR to SB supplied to the data detecting circuit 54 are supplied to the level detecting circuit 90, the computing circuit 58, and the NAM circuit 53, respectively. The NAM circuit 53 selects the highest level signal from among the color signals SR to SB and outputs a NAM signal NMY. The NAM signal NMY is supplied to the iris detecting circuit 59 and the peak level detecting circuit 56. The iris detecting circuit 59 performs peak detection and synchronous addition on the basis of the supplied NAM signal and controls the iris on the basis of the result. The computing circuit 58 performs a computation of (R+2G+B) on the signal levels of the color signals SR to SB in order to generate an approximate brightness signal ADY which is supplied to the gate signal generating circuit 68 and the peak level detecting circuit 56. The gate signal generating circuit 68 generates a gate signal GT1 on the basis of the brightness signal ADY and supplies the gate signal GT1 to the level detecting circuit 90.

(3) Gate Signal Generating Circuit

Figure 4:
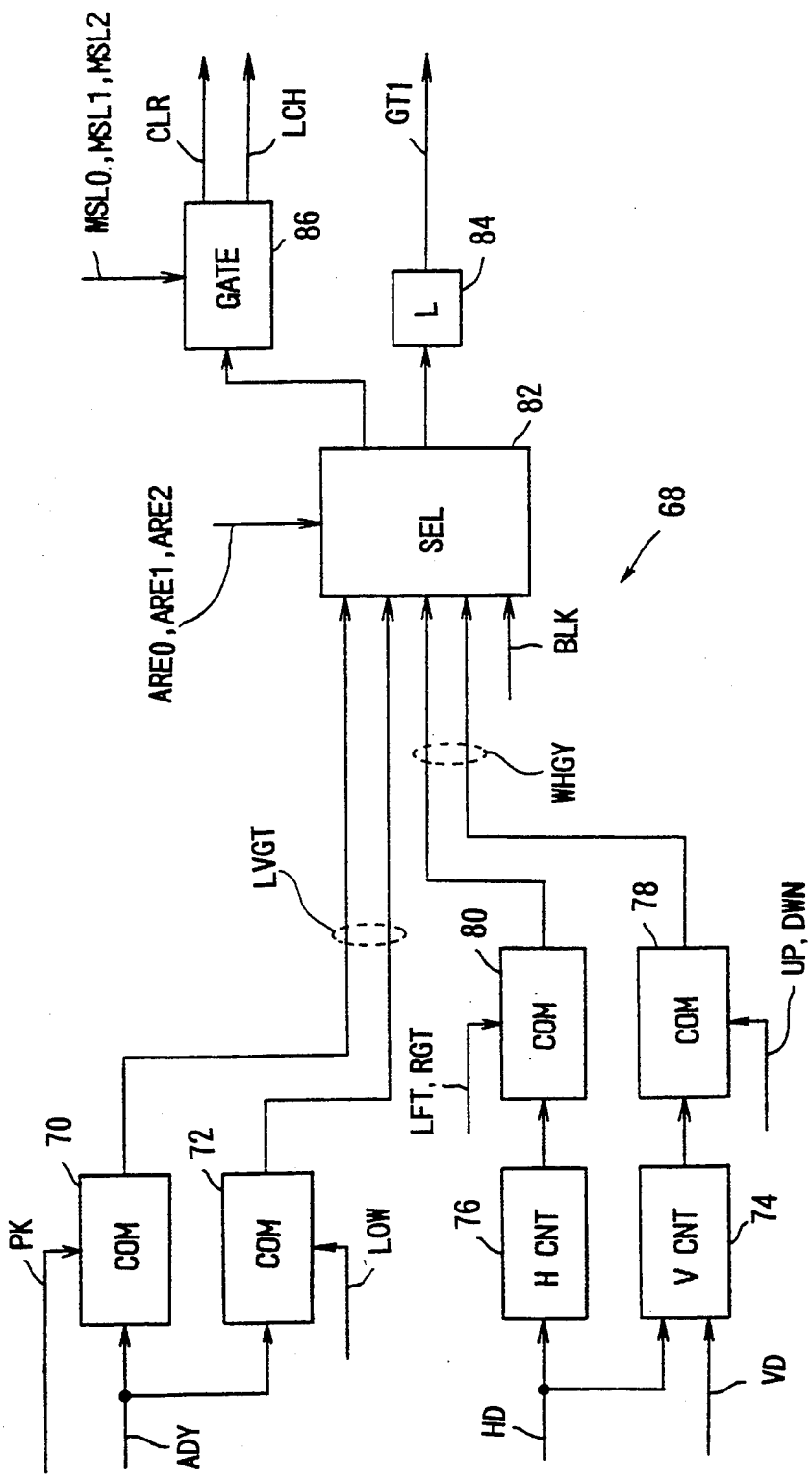
FIG. 4 is a block diagram illustrating a gate signal generating circuit in accordance with the present invention.

The data detecting circuit 54 generates a gate signal for data detection by means of the gate signal generating circuit 68, as shown in FIG. 4. The gate signal generating circuit 68 outputs a gate signal GT1 based on the level of the brightness signal ADY as a reference in order to set the white balance adjustment region in a white balance adjustment mode, whereas it can also set the timing of test signal detection in the self-diagnostic mode and the adjustment mode. That is, the gate signal generating circuit 68 supplies the brightness signal DY to comparison circuits 70 and 72 whereby the result of the comparison is output with predetermined comparison references PK and LOW as references. The comparison references PK and LOW can be set by the central processing unit 10 in accordance with the operation mode. Whereas the first comparison reference level PK is set by the central processing unit 10 with a peak level detected by the peak level detecting circuit 56 as a reference in the white balance adjustment mode, the first comparison reference level PK is set at the second comparison reference level LOW which is lower by a predetermined level than the first comparison reference level PK.

As a result, the comparison circuits 70 and 72 detect the brightness level in a region ranging from the first to the second comparison reference level and output the result of the detection as a level gate signal LVGT.

Thus, the gate signal generating circuit 68 switches the first and second comparison references PK and LOW in order to generate various gate signals LVGT with the level of the brightness signal ADY as a reference. Further, the gate signal generating circuit 68 supplies a vertical synchronization signal VD to a V counter 74 and a horizontal synchronization signal HD to the V counter 74 and an H counter 76.

The V counter 74 counts the horizontal synchronization signal HD one by one after the counter value is reset by the vertical synchronization signal VD and thus outputs a count value indicating a raster scanning position in the direction of vertical scanning. In contrast, the H counter 76 counts predetermined clock signals one by one after the count value is reset by the horizontal synchronization signal HD and thus outputs a count value indicating a raster scanning position in the direction of horizontal scanning.

A comparison circuit 78 uses two comparison reference values UP and DWN as references and increases the level of an output signal when the count value of the V counter 74 enters the range between these two comparison reference values UP and DWN. As a result, a gate signal whose level rises at a predetermined raster scanning position is generated in the direction of the vertical scanning.

In a similar manner, a comparison circuit 80 uses two comparison reference values LFT and RGT as references and causes the level of an output signal to rise when the count value of the H counter 76 enters the range between these two comparison reference values. As a result, a gate signal whose level rises at a predetermined raster scanning position is generated in the direction of the horizontal scanning.

Thus, the gate signal generating circuit 68 can generate various gate signals WHGT whose level rises at a predetermined region of a produced image. The comparison reference values UP and DWN, and LFT and RGT of the correcting circuits 78 and 80 can be set by the central processing unit 10. Therefore, the gate signal generating circuit 68 is capable of switching the timing of the gate signal WHGT in accordance with the operation mode.

A selector 82 switches the operation on the basis of control signals ARE0 to ARE2 output from the central processing unit 10. In the self-diagnostic mode, the selector 82 selects and outputs the gate signal WHGT or a blanking signal BLK output from the correcting circuits 78 and 80, whereas in the white balance adjustment mode, the selector 82 selects and outputs the level gate signal LVGT.

As a result, as shown in FIGS. 9A and 9B, when the level of the brightness signal ADY (FIG. 9A) rises sharply, the gate signal generating circuit 68 generates a level gate signal so that the signal level rises except for the sharp rising portion, selects and outputs the level gate signal LVGT as a gate signal GT1 (FIG. 9B) in the white balance adjustment mode, thereby setting a white balance adjustment region.

Thus, a white balance adjustment region is set except for a portion where the brightness level rises sharply, making it possible to easily and reliably adjust white balance except for the portion where illumination is reflected.

In this embodiment, the gate signal generating circuit 68 supplies a selected output from the selector 82 to a gate circuit 86 where a first gate signal CLR and a second gate signal LCH are generated on the basis of the selected output in response to mode switching signals MLS0 to MSL2 output from the central processing unit 10.

Thus, the gate signal generating circuit 68 selectively uses the gate signals CLR and LCH in accordance with the operation mode, making it possible to simplify the adjustment operation and confirm the operation mode or the like.

(4) Level Detecting Circuit

Figure 5:
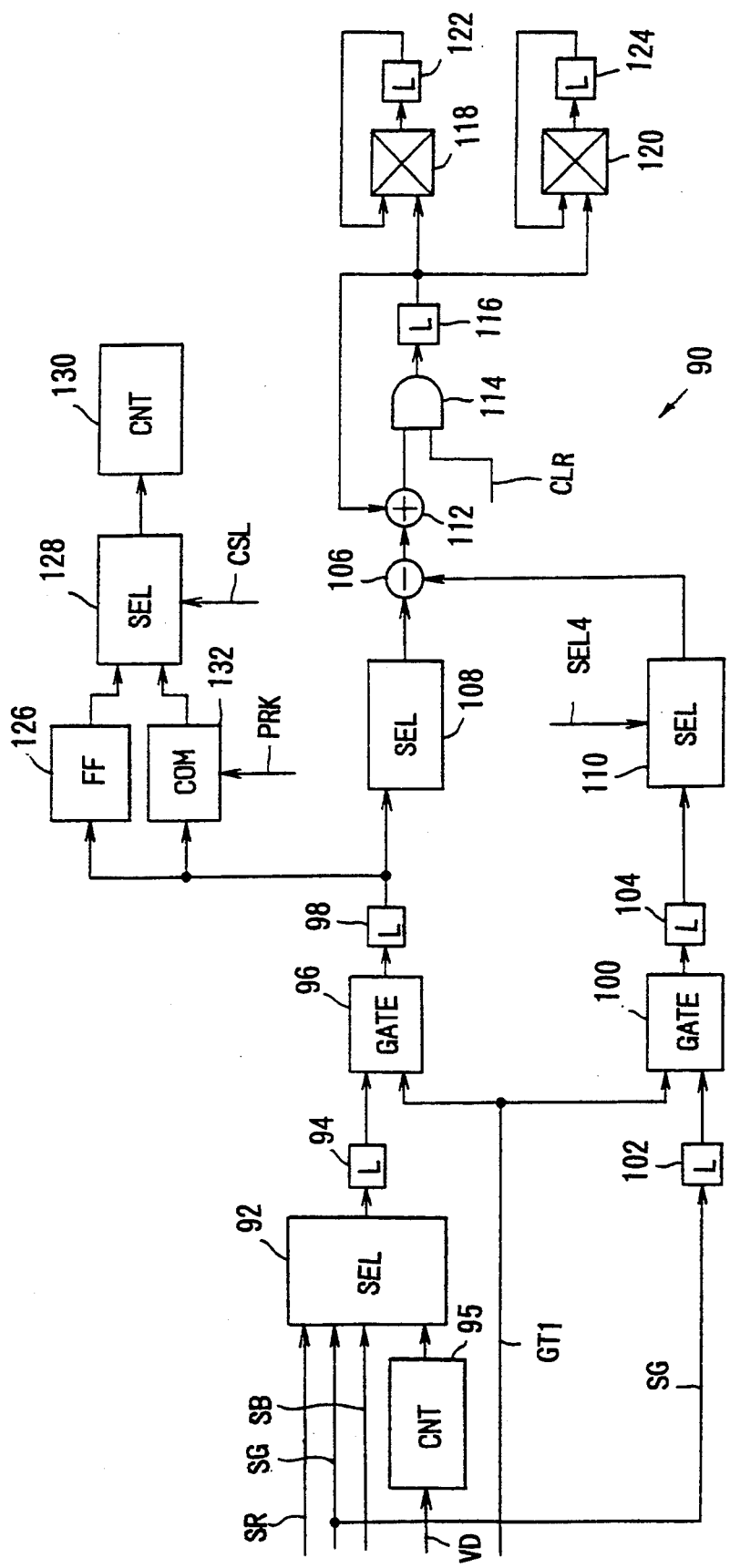
FIG. 5 is a block diagram illustrating a level detecting circuit in accordance with the present invention.

As shown in FIG. 5, the level detecting circuit 90 detects various signals with the gate signal GT1 supplied from the gate signal generating circuit 68 as a reference, and detects, as a result of this detection, the difference in signal levels between the red color signal and the green color signal, and between the blue color signal and the green color signal, in the white balance adjustment mode. That is, the level detecting circuit 90 supplies the various color signals SR to SB to a selector 92 which outputs its selected signal through a latch circuit 94.

On the basis of a control signal output from the central processing unit 10, the selector 92 switches the contact point of the selector 92 so that the level of the color signals SR to SB can be detected in this embodiment. As a result, the selector 92 switches the contact point in field units and alternately selects and outputs a red color signal SR or a blue color signal SB in field units.

In contrast, in the adjustment and self-diagnostic mode, the contact point is switched in turn in field units, thereby cyclically outputting in turn the color signals SR to SB.

In addition to the color signals SR to SB, the selector 92 inputs an output signal from a counter circuit 95, and selects and outputs a reference signal which rises at a cycle of three fields in place of the color signals SR to SB on the basis of this input.

A gate circuit 96 outputs a selected output from the selector 92 to a latch circuit 98 during the period in which the level of the gate signal GT1 rises, thereby selecting and outputting the color signals SR to SB in the white balance adjustment region in the white balance adjustment mode.

In contrast, in the self-diagnostic and adjustment modes, the gate circuit 96, similarly to the above, sends out an output signal from the latch circuit 94 during the time period in which the level of the gate signal GT1 rises, thereby selectively outputting a horizontal scanning period signal during a vertical blanking period, a video period signal or the like, regarding the color signals SR to SB.

A gate circuit 100 receives a green color signal SG through a latch circuit 102, and selects and outputs the green color signal SG to a latch circuit 104 during the period in which the level of the gate signal GT1 rises. As a result, the level detecting circuit 90 cuts out the white balance adjustment region and outputs the color signals SR to SB.

A subtraction circuit 106 receives output signals from the latch circuits 98 and 104 via the selectors 108 and 110, respectively, and outputs the subtracted output of these signals to an addition circuit 112.

As a result, in the white balance adjustment mode, the level detecting circuit 90 outputs alternately at field cycles a first subtracted output signal obtained by subtracting a green color signal from a red color signal and a second subtraction signal obtained by subtracting a green color signal from a blue color signal.

In contrast, in the adjustment and self-selection modes, the selector 110 decreases the level of the output signal on the basis of a control signal SEL4 from the central processing unit 10, thereby stopping the subtraction operation of the subtraction circuit 106 so that, for example, data for adjusting black level can be detected.

The level detecting circuit 90 inputs, in addition to an output signal from the latch circuit 98, a predetermined subtracted output, to the selector 108, thereby switching the contact point of the selector 108 so that the signal level of this subtraction output can be detected.

The addition circuit 112 outputs an output signal to a latch circuit 116 through an AND circuit 114 and feeds back an output signal from the latch circuit 116 as an addition input. The AND circuit 114 is input a clear signal CLR in synchronization with a vertical synchronization signal in the white balance adjustment mode, thereby causing thereby causing the addition circuit 112 to accumulate the output signal from the selector 108 at field cycles.

As a result, in the level detecting circuit 90, the difference between the red color signal and the green color signal, and between the blue color signal and the green color signal, in the white balance adjustment region is accumulated through the latch circuit 116 at field cycles.

In contrast, in the self-diagnostic and adjustment modes, since the subtraction operation by the subtraction circuit 106 is stopped, a signal level accumulated value can be obtained in field units as regards the color signals SR to SB in a period in which the gate signal GT1 is rising.

The selectors 118 and 120 each switch the contact point at field cycles, thereby latching the accumulated value of the latch circuit 116 at field cycles in latch circuits 122 and 124, respectively.

As a result, the level detecting circuit 90 latches the accumulated values of signal level difference between the red color signal and the green color signal, and between the blue color signal and the green color signal, in the white balance adjustment region in the latch circuits 122 and 124, respectively, and outputs the accumulated value to the central processing unit 10.

Also, the image pick-up device 1 performs white balance adjustment so that the accumulated result reaches a "0" level.

In contrast, in the adjustment mode, the level detecting circuit 90 causes the accumulated value of the signal levels to be stored sequentially and cyclically in the latch circuits 122 and 124 as regards the color signals during a period in which the level of the gate signal GT1 rises. The image pick-up device 1 adjusts each circuit block on the basis of the accumulated value.

In the self-diagnostic mode, the clear signal CLR which is input to the AND circuit 114 is made to rise at the rise of the test signal TS interposed in a vertical blanking period and at the rise of the video period. In response to this, the accumulated value of the signal level with the timing of the rise of each clear signal CLR as a reference is accumulated in the latch circuits 122 and 124.

As a result, the image pick-up device 1 monitors the test signal interposed in a vertical blanking period on the basis of the accumulated value stored in the latch circuit 122, and detects the level of the video period signal on the basis of the accumulated value stored in the latch circuit 124, so that an abnormality in a circuit block can be detected while controlling, for example, the iris 6.

Further, in this embodiment, the level detecting circuit 90 supplies an output signal from the latch circuit 98 to a flip-flop (FF) circuit 126, so that a detected output is generated by which the signal level is made to rise in units of pixels of the solid-state image pick-up device 2 within the white balance adjustment region via the flip-flop circuit 126, for example, in the white balance adjustment mode.

A counter 130 receives signals from the flip-flop circuit 126 via the selector 128 and counts the output signal at field cycles. Thus, the number of pixels during the period in which the gate signal GT1 is rising is detected.

As a result, in the image pick-up device 1, the accumulated value of the latch circuits 122 and 124 is divided by the count value of the counter 130, making it possible to easily detect the signal level in one pixel units.

In this embodiment, the selector 128 switches the contact point on the basis of a predetermined control signal CSL so that the level detecting circuit 90 can output various count values as required in an operation mode other than the white balance adjustment mode.

In response to the switching of the operation of the selector 128, the selector 128 inputs an output signal from the latch circuit 98 via the comparison circuit 132. The comparison circuit 132 outputs the result of the comparison of the output signal from the latch circuit 98 with the comparison reference value PRK set by the central processing unit 10 as a reference.

As a result, it is possible for the level detecting circuit 90 to detect the number of pixels of various color signals exceeding the reference level.

(5) Peak Level Detecting Circuit

Figure 6:
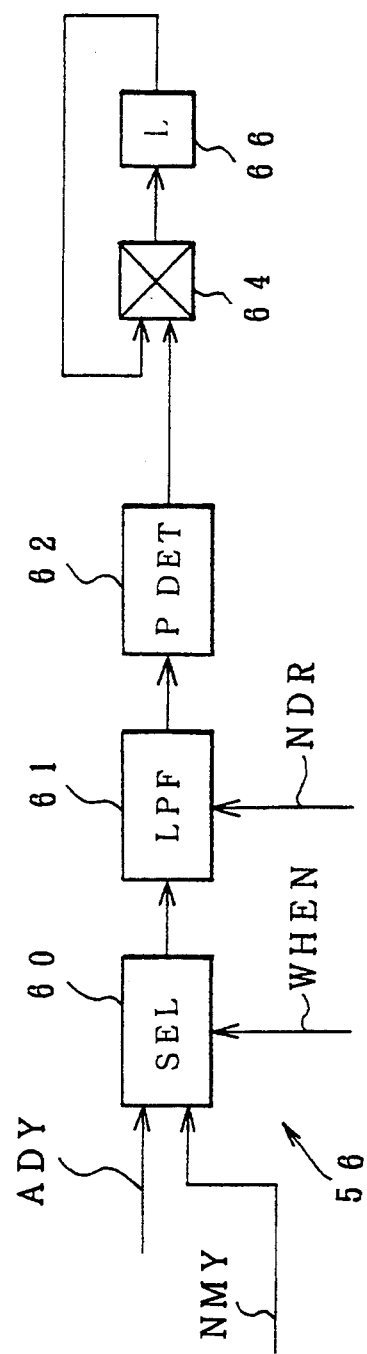
FIG. 6 is a block diagram illustrating a peak level detecting circuit in accordance with the present invention.

The data detecting circuit 54 detects the peak level by the peak level detecting circuit 56 shown in FIG. 6, in the white balance adjustment mode and sets a white balance adjustment region on the basis of the result of this detection of the peak level.

Figure 11:
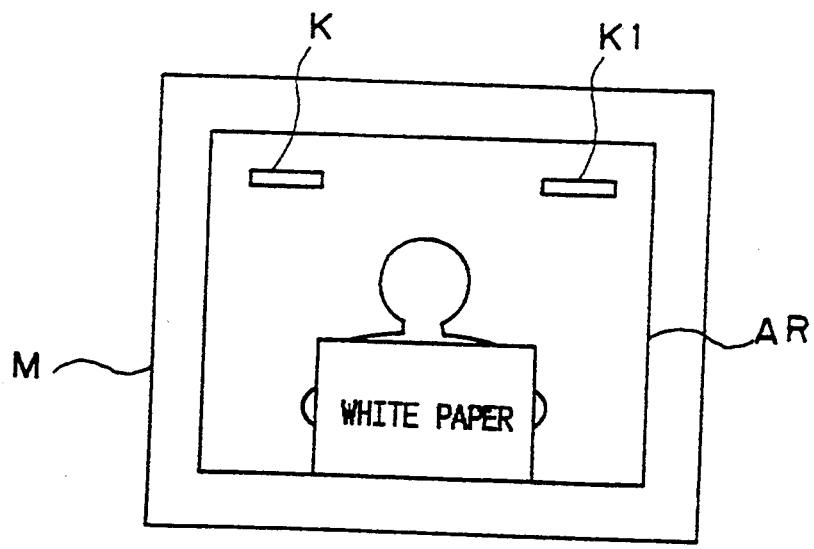
FIG. 11 is a schematic diagram illustrating an erroneous adjustment of white balance.

The selector 60 selectively outputs the brightness signal ADY with a window signal WHEN generated by a predetermined reference signal generating circuit as a reference and thus outputs the brightness signal ADY to a low-pass filter (LPF) circuit 61 as regards a predetermined effective detection region (corresponding to the region indicated by the symbol AR as shown in FIG. 11) except for the peripheral portion of the produced image.

The low-pass filter circuit 61 suppresses the high-pass components of the brightness signal ADY in order to suppress the brightness level of a portion where the brightness level rises sharply in the direction of horizontal scanning and to output it. That is, as shown in FIG. 8, the brightness level rises sharply in the direction of horizontal scanning as regards a portion, such as the portion K2 (FIG. 12) where illumination is reflected. The peak level can be suppressed easily by means of the low-pass filter circuit as indicated by the oblique line, as shown in FIG. 13, as regards the portion where the brightness level rises sharply as described above.

As a result, the peak level detecting circuit 56 detects the peak level except for the portion where the brightness level rises sharply as above, making it possible to easily and reliably perform white balance adjustment.

The low-pass filter circuit 61 switches the operation on the basis of a control signal NDR output from the central processing unit 10, so that the frequency characteristics are switched and the operation is stopped as required in an operation mode other than the white balance adjustment mode.

A peak detecting circuit 62 detects a peak level on the basis of the brightness signal ADY input via the low-pass filter circuit 61, and latches the result of this detection in a latch circuit 66 via the selector 64. As a result, the peak level detecting circuit 56 detects the peak level of the brightness signal within an effective detection region, and stores the result of this detection in the latch circuit 66.

In this embodiment, the peak level detecting circuit 56 detects the peak level of the color signals in other adjustment modes. Therefore, the selector 60 is designed to select and output an NMY signal in place of an output signal from the computing circuit 58 as required.

In contrast, the latch circuit 66 feeds back the output signal via the selector 64, so that the selector 64 is switched as required and the latched data can be updated.

The central processing unit 10 switches the operation on the basis of serial data input via predetermined jig during assembly maintenance of the image pick-up device 1, thereby being switched to the adjustment mode.

In this condition, the central processing unit 10 executes processing programs in accordance with the adjustment items on the basis of the control data which is input next, thereby automatically adjusting the adjustment items.

Figure 14:
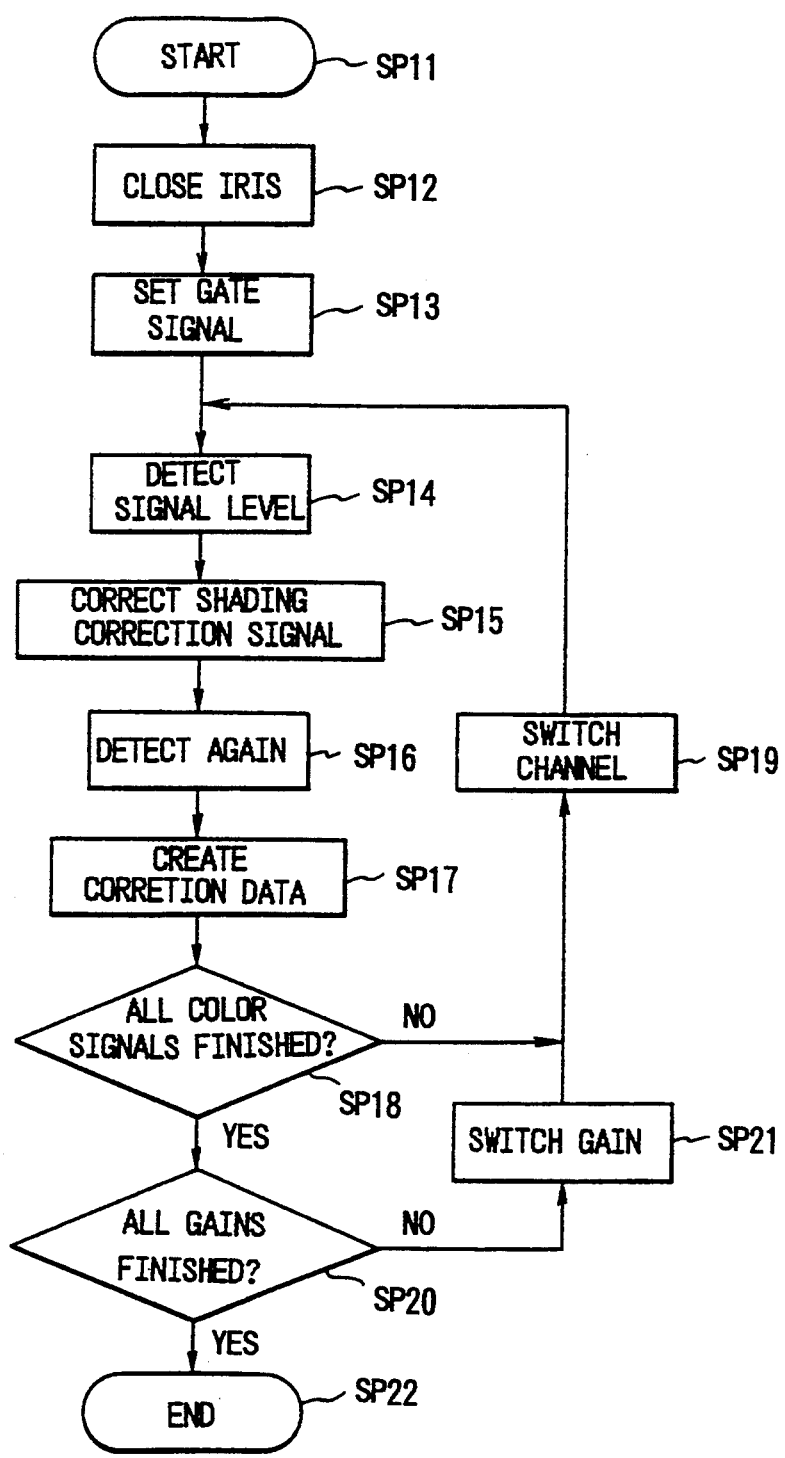
FIG. 14 is a flowchart illustrating black level adjustment processing.

Referring now to FIG. 14, in the black level adjustment of the central processing unit 10, the process proceeds from step SP11 to step SP12 where the iris 6 is closed, and the process proceeds to step SP13.

In this step, the central processing unit 10 outputs a control signal to the gate signal generating circuit 68, so that the comparison references LFT, RGT, UP and DWN are set and the contact point of the selector 82 is switched.

As a result, the central processing unit 10 generates the gate signal GT1 by which the signal level rises in an effective region of the produced image, and then the process proceeds to step SP14. In this step, the central processing unit 10 inputs the accumulated values latched in the latch circuits 122 and 124 of the level detecting circuit 90, and then the accumulated values are each divided by the count value of the counter 130.

That is, in the image pick-up device 1, since the iris 6 is completely closed, the accumulated values of the latch circuits 122 and 124 are divided by the count value of the counter 130, so that black level can be detected in one pixel units.

At this time, the central processing unit 10 switches the latch circuits 122 and 124 in field units and latches the accumulated values in the latch circuit 122 or 124, thereby detecting the black level of the color signals in even- and odd-number fields. That is, the black level of output signals from the solid-state image pick-up element may vary from field to field. In this case, it is necessary to adjust the black level for each field. For this reason, the central processing unit 10 detects the black level in even- and odd-number fields, and corrects the black level on the basis of the result of this detection.

When the result of this detection is obtained, the central processing unit 10 proceeds to a subsequent step SP15 where a correction value proportional to the detection result is added to a preset shading correction value in order to generate a correction data DP, and the correction data DP is output to the shading correcting circuit 50.

Figure 7:
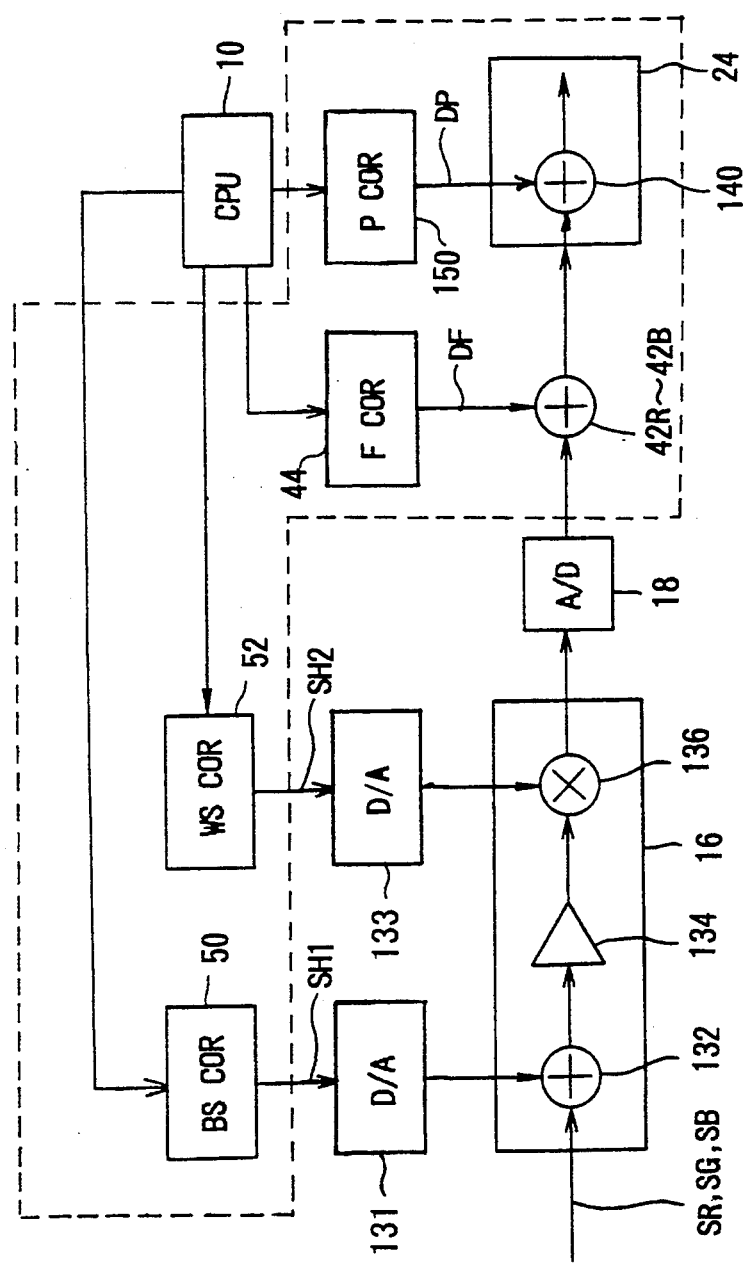
FIG. 7 is a block diagram illustrating black level adjustment circuit.

As shown in FIG. 7, the black level shading correction signal SH1 is added to the color signals SR to SB via a digital/analog conversion circuit 131 by an addition circuit 132 in the analog signal processing circuit 16. Thereafter, the color signals SR to SB are amplified by a gain amplifier 134, and the color signals SR to SB is multiplied by the white level shading correction signal SH2 via a digital/analog conversion circuit 133 by means of a multiplication circuit 136 which is positioned next.

Further, after the color signals SR to SB are converted into digital signals by an analog/digital conversion circuit 18 which is positioned next, a flare correction signal DF are added thereto by addition circuits 42R to 42B, thereby correcting flare. Next, the comparison signal DP output from a pedestal comparison circuit 150 is added by an addition circuit 140 of the video processing circuit 24, thus setting the pedestal level.

At this point, the central processing unit 10 corrects the direct current level of the shading correction signal SH1 on the basis of the result of the detection of the black level. The shading correction signal SH1 is added to the color signals by the addition circuit 132 in order to correct the black level shading and to set the black level. As a result, the black level is automatically coarsely adjusted with a simple construction.

Next, the central processing unit 10 stores the direct current level at which the shading correction signal SH1 is corrected in a memory circuit. Then, the process proceeds to step SP16 where the accumulated results of the latch circuits 122 and 124 is input again and then the accumulated results are divided by the count value of the counter 130, thereby detecting the black level in one pixel units.

That is, when the direct current level of the color signals in an analog form is corrected, it is difficult to set the level with a high degree of accuracy due to an influence of noise or the like. Further, since the shading correction signal SH1 is output via the digital/analog conversion circuit 131, there is a drawback in that the accuracy cannot be improved higher than the resolution of the digital/analog conversion circuit 131.

In contrast, in this embodiment, since the color signals SR to SB are amplified by the gain amplifier 134 after shading correction, if the gain of the gain amplifier 134 is increased, a very small offset of black level is amplified and output to such extent, directly affecting the video processing circuit 24 or the like at subsequent stages. In addition, when the direct current level is corrected as regards color signals in analog signal form, there is a drawback in that it takes a long time for the level to converge to a fixed value.

For this reason, the central processing unit 10 outputs the correction data DP to the video processing circuit 24 on the basis of the result of the redetection of black level. The analog signal processing circuit 16 coarsely adjusts the black level in accordance with the correction data DP, and then the black level is finely adjusted by a digital signal processing system.

In a subsequent step SP17, the central processing unit 10 corrects the value of the correction data DP for setting the pedestal level on the basis of the redetection of black level so that the comparison data is added by the addition circuit 140 in order to set the pedestal level at a predetermined value and also the black level at a predetermined level.

In order words, the central processing unit 10 automatically adjusts the black level on the basis of the result of the detection of black level. At this time, after coarse adjustment is performed by an analog system, fine adjustment is performed by a digital system, making it possible to easily and reliably adjust the black level and improve the adjustment accuracy.

Further, the accuracy of the adjustment can be improved to the extent of this fine adjustment in the step of setting the pedestal level before gamma correction.

At this time, the central processing unit 10 obtains the result of the black level detection for each even- and odd-number field, and switches the correction data DP in the even- and odd-number fields on the basis of such detection. There are cases in which the level of black may vary from the field to field in the output signal from the solid-state image pick-up element. In such cases, it is necessary to change the black level adjustment for each field.

However, since this variation is repeated in the field units, the variation cannot be completely corrected by an analog signal processing system.

For this reason, the central processing unit 10 switches the correction data DP for finely adjusting the black level in the even- and odd-number fields in order to correct variations in the black level. Thus, the central processing unit 10 stores the contents of the correction data DP and the correction values of the shading correction signals in a memory circuit. Thereafter, the process proceeds to step SP18 where the central processing unit 10 determines whether the black level has been set for all the color signals. Since a negative result is obtained in this case, the channel is switched, and the process returns to step SP14.

Thus, the central processing unit 10 repeats the processing loop of steps SP14-SP15-SP16-SP17-SP18-SP19-SP14. When the black level has been completely corrected for all the color signals, the process proceeds to step SP20 because an affirmative result is obtained at step SP18. In step SP20, the central processing unit 10 determines whether the black level has been set for all the gains. Since a negative result is obtained in this case, the process proceeds to step SP21 where the gain of the gain amplifier 134 is switched.

In this embodiment, in the image pick-up device 1, the amplification factor of color signals can be switched in two steps in 6 [dB] units as contrasted with a normally operating state by operating a predetermined operation element, making it possible to make the brightness of the entire image plane brighter. Therefore, when there is an offset voltage in the addition circuit 132 or the like, the black level varies in response to this switching of the gain.

For this reason, in this embodiment, the central processing unit 10 adjusts the black level for each gain, and stores the contents in a memory circuit. Thereafter, the process proceeds to step SP22 where this operation procedure is terminated. Thus, the black level of each color signal is corrected in order to adjust the black level.

As a result, the central processing unit 10 corrects the correction data DP for correcting the direct current level of the shading correction signal SH1 and for correcting the pedestal level for each having in an operating state on the basis of the direct current level store in the memory circuit. As a result, the central processing unit 10 corrects the black level in order to adjust the black level and also to perform an operation for correcting the shading of color signals and an operation for setting the pedestal level.

Figure 16:
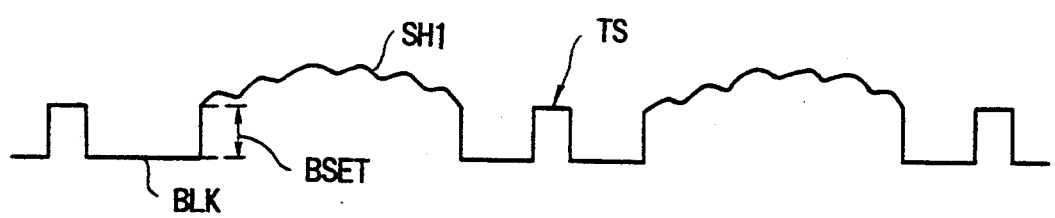
FIG. 16 is a wave form chart illustrating shading correction signal.

That is, as shown in FIG. 16, the central processing unit 10 shifts the direct current level of the shading correction signal SH1 by an amount corresponding to BSET in the operating state, corrects the amount of this shifting on the basis of the result of the black level detection, and coarsely adjusts the black level of each color signal. Further, the central processing unit 10 switches the value of the correction data DP in accordance with the contents of the memory circuit, thereby finely adjusting the black level of each color signal.

Therefore, the image pick-up device 1 can automatically adjust the black level, making it possible to simplify assembly and maintenance operations to such extent.

Further, in this embodiment, the central processing unit 10 interposes the test signal TS into the shading correction signal SH1 at a predetermined timing during a horizontal-blanking period, and monitors the operating state of the circuit blocks from the analog signal processing circuit 16 to the digital signal processing circuit 20. That is, the central processing unit 10 sets, in the operating state, the test signal generating circuit 30 so that the test signal TS maintained at a predetermined level is output, and switches the contact points of the selectors 34R to 34B to the test signal TS side at s predetermined timing during a horizontal blanking period.

As a result, the central processing unit 10 makes the signal level of the shading correction signal SH1 rise from a blanking level BLK to the predetermined signal level at a predetermined timing during s horizontal blanking period, and outputs the shading correction signal SH1 to the addition circuit 130.

Therefore, shading correction is performed on the color signals output from the analog signal processing circuit 16 on the basis of the shading correction signal SH1 during a video period, whereas the signal rises to a signal level corresponding to the test signal TS during a period in which the test signal TS is interposed.

The central processing unit 10 outputs a control signal to the data detecting circuit 54 in this condition in order to make the level of the clear signal CLR rise in accordance with the rise of the test signal TS and the rise of the video period, so that the accumulated value of the signal level of the test signals and the color signals of the video period are detected. Next, the central processing unit 10 stores the accumulated values in the latch circuits 122 and 124, and inputs the accumulated value of the test signal stored in the latch circuit 122 and determines whether the signal level is a predetermined value.

When the gain amplifier 134 or the like fails, the signal level of the test signal TS input to the data detecting circuit 54 varies in accordance with the contents of the failure, making it possible to detect the presence or absence of failures in the circuit blocks from the analog signal processing circuit 16 to the analog/digital conversion circuit 18 on the basis of the result of the signal level detection of the test signal.

Therefore, when the signal level differs from the predetermined value, the central processing unit 10 displays an error message on a monitor image plane within the view finder in order to sound an alarm to a cameraman.

As a result, failures can be quickly dealt with at an initial stage thereof in the image pick-up device 1, and ease of use can be improved to such extent.

At this time, if the test signal TS is interposed into a horizontal blanking period of the shading correction signal SH1 and output to the analog signal processing circuit 16, the overall construction can be simplified with compared with a case in which the test signal TS is fed back singly.

With the above-described construction, since the black level is set at a predetermined value on the basis of the result of the detection of black level, the black level can be automatically adjusted with a simple construction, making it possible to simplify assembly and maintenance operations to such extent. By correcting the signal level of the shading correction signal in order to coarsely adjust the black level at this time and by correcting the correction data DP of the pedestal level to finely adjust the black level, the black level can be adjusted easily with a high degree of accuracy.

Although a case in which correction data DP for setting the pedestal level is corrected in order to finely adjust the black level has been described in the above-described embodiment, flare correction data DF may be corrected to finely adjust the black level.

That is, in the flare correction data, since the value of the flare correction data DF varies in accordance with the amount of incident light, the value of the flare correction data DF is made offset on the basis of the result of the detection of the black level, thereby setting the black level at a predetermined level. The black level can also be adjusted with a high degree of accuracy even in the above-described way.

In addition, although a case in which an addition circuit intended for correcting shading is used instead to coarsely adjust the black level has been described in the above-described embodiment, a dedicated addition circuit may be provided separately so that the black level can be finely adjusted by switching the addition signal of this addition circuit.

In addition, although a case in which the black level is automatically adjusted has been described in the above-described embodiment, the present invention is not limited to this case, but can be broadly applied to, for example, a case in which correction data or the like is input manually.

In addition, although a case in which the black level is detected in an effective region of the image plane and automatically adjusted has been described in the above-described embodiment, the present invention is not limited to this case, but can be broadly applied to, for example, a case in which the black level is detected and adjusted as regards the video period, or a case in which a predetermined region is set within an effective region and the black level is detected within this region.

In addition, although a case in which the black level of encoder is adjusted to a reference level has been described in the above-described embodiment, the present invention is not limited to this case, but, for example, the black levels of red and blue color signals may be set at this black level with the green color as a reference so as to adjust the black balance.

In addition, although a case in which a test signal is interposed to a horizontal blanking period in order to monitor the operation of circuit blocks has been described in the above-described embodiment, the present invention is not limited to this case, but, for example, a test signal may be omitted and the monitoring operation may be omitted.

Figure 15:
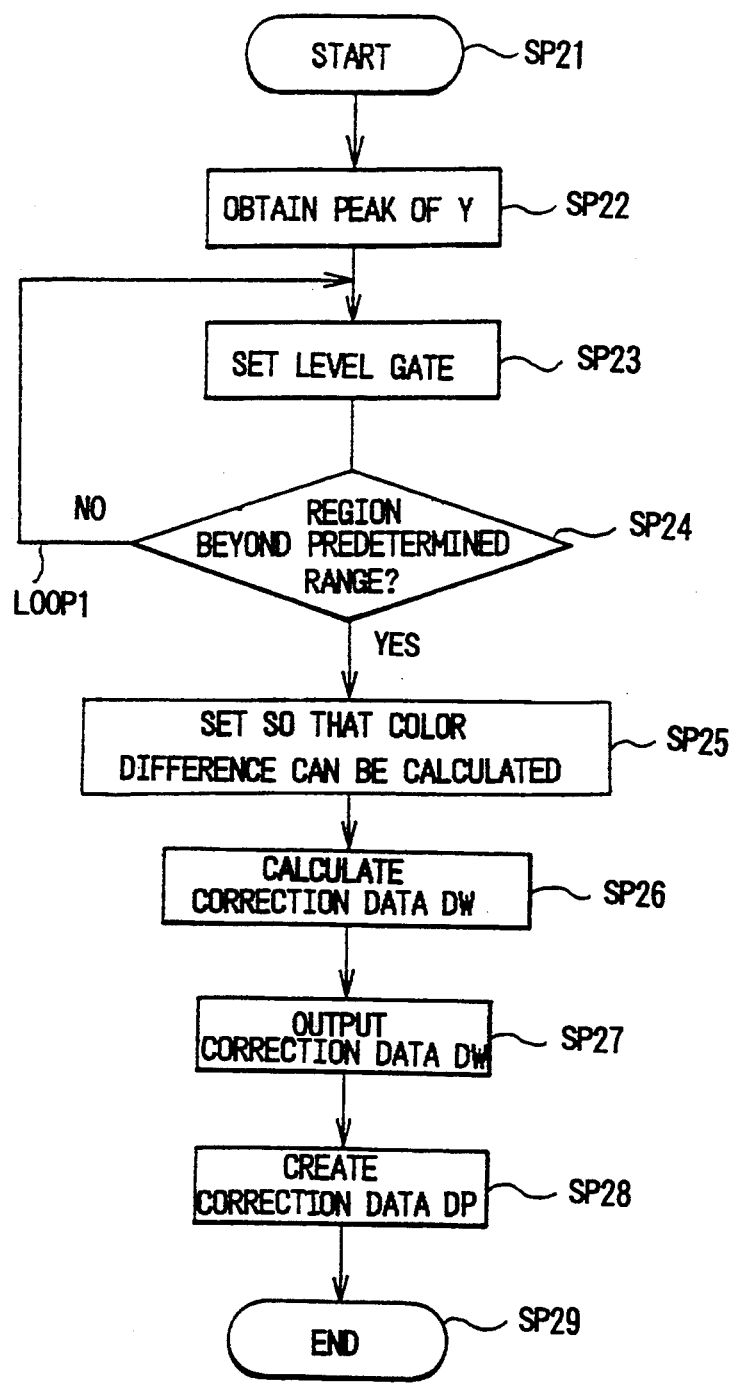
FIG. 15 is a flowchart illustrating white level adjustment processing.

Next, the central processing unit 10 executes the operation procedure shown in FIG. 15 in the white balance adjustment mode.

When a white balance adjustment region is set and white balance adjustment is performed, in practice, a region of approximately 10% of the entire image plane is required as a white balance adjustment region to reliably perform white balance adjustment.

In contrast, when a peak level is detected and a white balance adjustment region is set, as shown in FIG. 11, if a fluorescent lamp K1 is present within an effective region AR of the image plane M, there is a risk in that the fluorescent lamp K1 is erroneously set in the white balance adjustment region.

Figure 12:
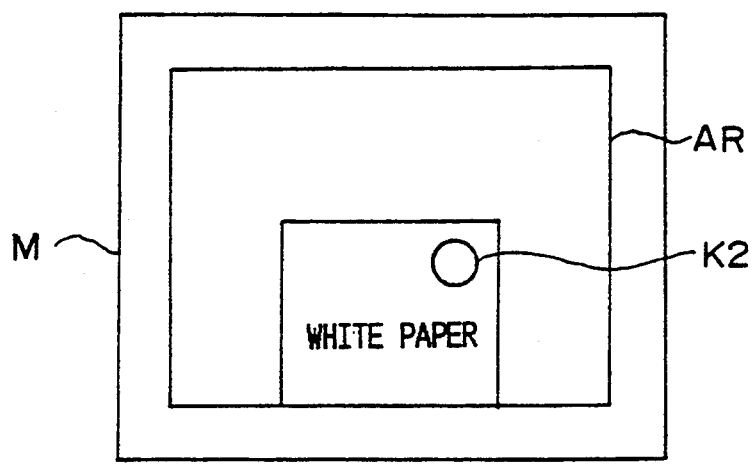
FIG. 12 is a schematic diagram illustrating an erroneous adjustment of white balance when a portion having a partially high brightness level is present.
Figure 13:
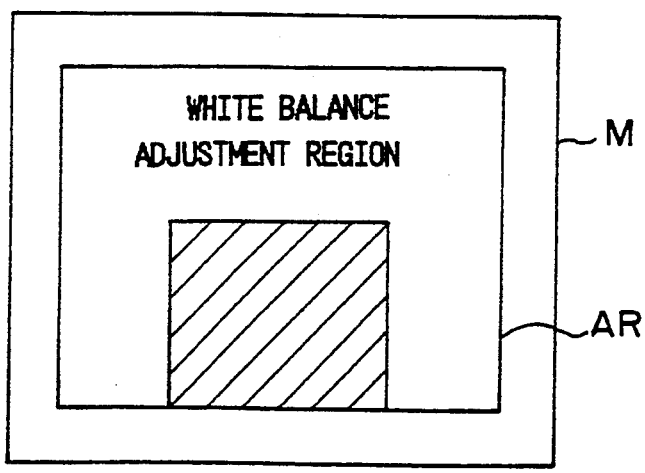
FIG. 13 is a schematic diagram illustrating the display of a white balance adjustment region.

In addition, as shown in FIG. 12, even if light is reflected on white paper or the like prepared for white balance adjustment and a portion K2 having a high level of brightness occurs partially, there is a risk in that this portion is erroneously set in the white balance adjustment region similarly to the above. When the white balance adjustment region is narrow as above and further when a portion having an extremely high level of brightness is present, there is a problem in that white balance adjustment cannot be performed reliably.

One method for solving this problem is one in which when a white balance adjustment region is detected, a shaded pattern is displayed in this region, calling the cameraman's attention, as shown in FIG. 13.

However, in this method, the white balance adjustment region is merely displayed. After all, the cameraman must determine whether it has been possible to adjust the white balance adjustment.

In this embodiment, the operations described below are performed to solve the above problem.

In the central processing unit 10, when an operation element for starting white balance adjustment provided on an operation panel is turned on, the process proceeds from step SP21 to step SP22. After the operation mode of the entire image pick-up device 1 is set at the white balance adjustment mode, the result of the detection of the peak level is input from the peak level detecting circuit 56.

Next, in the central processing unit 10, the process proceeds to step SP23 where the comparison references PK and LOW of the gate signal generating circuit 68 are set. More specifically, after the central processing unit 10 sets the peak level detected by the peak level detecting circuit 56 at the first comparison reference level PK, a level which is low by a predetermined level than the first reference level PK1 is set at a second reference level LOW1. As a result, the central processing unit 10 sets the white balance adjustment region on the basis of the result of the detection of the peak level.

Next, in the central processing unit 10, the process proceeds to step SP24 where the count value of the counter 130 is input and then a determination is made whether the solid-state image pick-up device region is more than 10% of the effective region on the basis of the count value.

Even if a portion where the brightness level rises sharply is suppressed by using the low-pass filter circuit 61, it is difficult to suppress the brightness level as regards, for example, a fluorescent lamp having a long portion in the direction of horizontal scanning. This circumstance will be explained with reference to FIG. 11.

In the above case, it is possible to suppress the peak level also as regards a horizontally long portion as in a fluorescent lamp by using a two-dimensional low-pass filter circuit for vertically suppressing high-pass filter circuit for vertically suppressing high-pass components. However, there is a drawback to this case in that the overall construction becomes complex.

Figure 10:
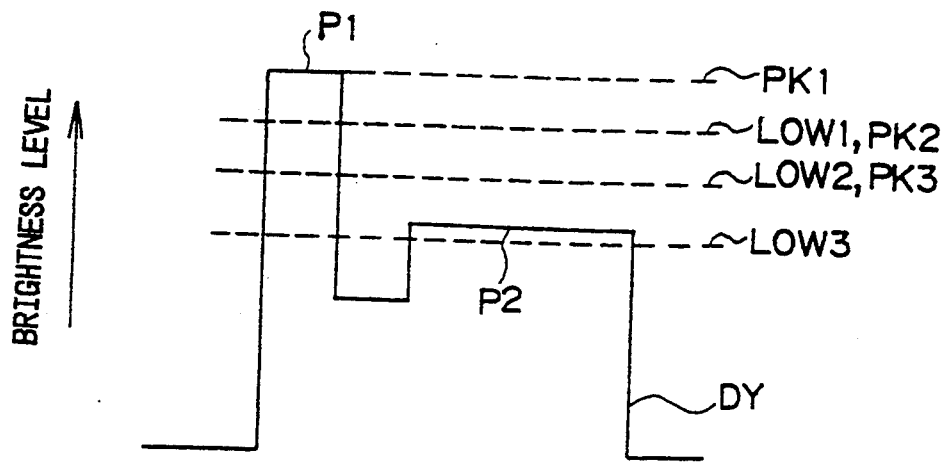
FIG. 10 is a signal waveform chart illustrating the operation for updating a level gate signal.

For this reason, in this embodiment, as shown in FIG. 10, the size of the white balance adjustment region is detected in accordance with the first reference level PK1 and the second reference level LOW1 which have been set initially. When the detected region does not exceed the predetermined range, a first reference level PK2 and a second reference level LOW2 are in turn updated, so that a portion having a high level of brightness as in a fluorescent lamp is eliminated and the white balance adjustment region is set.

That is, during the white balance adjustment, by producing an image of a white board or the like which serves as a reference and making an adjustment so that this portion is white, even if a portion, such as a fluorescent lamp, is formed into an image at a relatively larger area, the area is smaller as compared with the reference portion for white balance adjustment. Therefore, a determination of whether the white balance adjustment region is more than 10% of the effective region permits such a portion as in a fluorescent lamp to be easily detected.

In the central processing unit 10, if a negative result is obtained in step SP24, the process returns to step SP23 where the first reference level PK2 is updated to the second reference level LOW1 which has been set up to that time and then set at second reference level LOW2 which is lower by a predetermined level than the first reference level PK2.

As a result, the central processing unit 10 repeats the operation loop LOOP1 of step SP23-SP24-SP23, and updates the first and second reference levels. If the white balance region, an affirmative result is obtained in step SP24, causing the process of the central processing unit 10 to proceed to step SP25.

Next, the central processing unit 10 outputs a control signal to the level detecting circuit 90 and sets the selector 108 or the like in the white balance adjustment mode. Then, the process proceeds to step SP26 where the accumulated value stored in the latch circuits 122 and 124 is loaded together with the count value of the counter 130, and correction data DW for adjusting white balance is created so that the accumulated value is set at a "0" level.

Next, in the central processing unit 10, the process proceeds to step SP27 where correction data DW is output to the analog signal processing circuit 16, whereby the amplification factors of red; and blue color signals are switched and white balance adjustment is performed.

Thus, since the level differences between red signals and green signals and between blue signals and green signals are detected prior to gamma correction, variations in the white balance can be detected with a high degree of accuracy. Since white balance adjustment is performed on the basis of the result of this detection, white balance adjustment can be performed with a high degree of accuracy.

When white balance adjustment is performed in this way, the central processing unit 10 stores the correction data DW output to the analog signal processing circuit 16 in a memory circuit. At this time, the central processing unit 10 stores the correction data DW at a standard color temperature, which has previously been set during shipment from a factory, in a first memory space. In addition to the first memory space, a second and a third memory space are also prepared. As a result, the central processing unit 10 stores the correction data DW in the second and third memory spaces in accordance with the operation of the user during white balance adjustment.

As a result, the image pick-up device 1 switches the correction data DW in these second and third memory spaces and outputs it to the analog signal processing circuit 16, making it possible to select a first and a second white balance adjustment mode. Even when the white balance adjustment mode is switched and an image-taking site is moved from outdoors to indoors while, for example, following an image-forming subject, the image pick-up device 1 can easily perform white balance adjustment while following changes in the color temperature in consequence of this movement.

In addition, in the central processing unit 10, the process proceeds to step SP28 when the correction data DW for white balance adjustment is obtained, in which step correction data DP for black level is detected on the basis of the gain of the analog signal processing circuit 16 which is determined by the correction data DW.

The operation of this detection is performed by using a computation operation technique with the correction data of each gain obtained by the white balance adjustment as a reference. The central processing unit 10 stores the result of this computation operation in the second and third memory spaces in correspondence with correction data DW for white balance adjustment, and the process proceeds to step SP29 where this operation procedure is terminated.

As a result, the central processing unit 10 selects and outputs the first and second correction data DP for black level in correspondence with the first and second white balance adjustment mode, thereby correcting variations in the black balance in consequence of the switching of the gain of the white balance adjustment.

As a result, in the image pick-up device 1, even when the white balance adjustment mode is switched, variations in the black level can be prevented and the quality of the produced image can be improved to such extent.

Although in the above-described embodiment a case has been described in which the operation of the data detecting circuit 54 is switched to detect a peak level and a white balance adjustment region, a peak level and a white balance adjustment region may be detected by using a dedicated circuit.

In addition, although in the above-described embodiment a case has been described in which it is determined that white balance adjustment can be performed correctly when the white balance adjustment region is more than 10% of the entire effective region, this determination criterion may be set at various values as required.

In addition, although in the above-described embodiment a case has been described in which white balance adjustment is performed with the level of a green signal as a reference, each color signal may be set at a predetermined reference level and white balance adjustment may be performed.

In addition, although in the above-described embodiment a case has been described in which a level difference between color signals is detected prior to gamma correction and white balance adjustment is performed on the basis of this signal level difference, a level difference between color signals may be detected after gamma correction and white balance adjustment may be performed on the basis of the result of this difference in signal levels.

In addition, although in the above-described embodiment a case has been described in which a sharp rise of a brightness level is suppressed by a low-pass filter circuit and at the same time a first and a second reference level for setting a white balance adjustment region are updated, the low-pass filter circuit may be omitted as required.

In addition, although in the above-described embodiment a case has been described in which the second reference level up to that time is set newly at a first reference level and a second reference level is set at a level which is lower by a predetermined level than the first reference level, the first and second reference levels may be updated at will as required.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included with the spirit and scope of the claims. The following claims are to be accorded the broadest interpretation, so as to encompass all such modifications and equivalent structures and functions.

What is claimed is:

1. A color video camera comprising:
    image pick-up means for generating an image signal in response to light incident thereon;
    analog signal processing means for adding an analog correction signal to said image signal to coarsely adjust a black level of said image signal;
    analog to digital conversion means for converting the coarsely adjusted image signal output from said analog signal processing circuit into a digital image signal;
    digital signal processing means including: level detecting means for detecting the black level of said digital image signal, first correction signal generating means for generating a first digital correction signal in response to a first correction control signal, second correction signal generating means for generating a second digital correction signal in response to a second correction control signal, and addition means for adding said second digital correction signal to said digital image signal to finely adjust a black level of said digital image signal;
    digital to analog conversion means for converting said first digital correction signal into said analog correction signal; and
    control means for producing said first and second correction control signals in accordance with the black level of the digital image signal detected by said level detecting means.

2. A color video camera according to claim 1, wherein said first correction signal generating means corrects black shading of said digital image signal.

3. A color video camera comprising:
    image pick-up means for generating an image signal in response to light incident thereon;
    analog signal processing means for adding an analog correction signal to said image signal to coarsely adjust a black level of said image signal;
    analog to digital conversion means for converting the coarsely adjusted image signal output from said analog signal processing circuit into a digital image signal;
    digital signal processing means including: level detecting means for detecting the black level of said digital image signal, first correction signal generating means for generating a first digital correction signal in response to a first correction control signals, second correction signal generating means for generating a pedestal level correction signal in response to a second correction control signal, and addition means for adding said pedestal level correction signal to said digital image signal to finely adjust a black level of said digital image signal;
    digital to analog conversion means for converting said first digital correction signal into said analog correction signal; and control means for producing said first and second correction control signals in accordance with the black level of the digital image signal detected by said level detecting means.

4. A color video camera according to claim 1, wherein said second correction signal generating means performs flare correction of said digital image signal.

5. A color video camera comprising:

image pick-up means for generating an image signal having fields in response to light incident thereon;

analog signal processing means for adding an analog correction signal to said image signal to coarsely adjust a black level of said image signal;

analog to digital conversion means for converting the coarsely adjusted image signal output from said analog signal processing circuit into a digital image signal;

digital signal processing means including: level detecting means for detecting the black level of said digital image signal on a field by field basis, first correction signal generating means for generating a first digital correction signal in response to a first correction control signal, second correction signal generating means for generating a second digital correction signal in response to a second correction control signals, and addition means for adding said second digital correction signal to said digital image signal to finely adjust a black level of said digital image signal;

digital to analog conversion means for converting said first digital correction signal into said analog correction signal; and control means for producing said first and second correction control signals on a field by field basis in accordance with the black level of the digital image signal detected by said level detecting means.

6. A video camera comprising:

image pick-up means for receiving incident light to produce a first image signal having a black level, said first image signal including fields;

analog signal processing means for adding a first correction signal to said first image signal to coarsely adjust said black level of said first image signal; and digital signal processing means for generating said first correction signal as a function of the black level of the coarsely adjusted image signal and for finely adjusting said black level of said coarsely adjusted image signal, said digital signal processing means including means for detecting said black level on a field by field basis.

7. A video camera comprising:

image pick-up means for receiving incident light to produce a first image signal having a black level;

analog signal processing means for adding a first correction signal to said first image signal to coarsely adjust said black level of said first image signal to correct shading of said first image signal; and digital signal processing means for generating said first correction signal as a function of the black level of the coarsely adjusted image signal and for finely adjusting said black level of said coarsely adjusted image signal.

8. A video camera according to claim 7, wherein said digital signal processing means finely adjusts said black level of said coarsely adjusted image signal to correct at least one of flare in said coarsely adjusted image signal and a pedestal level of said coarsely adjusted image signal.

* * * * *